Patented Aug. 13, 1940

2,211,436

UNITED STATES PATENT OFFICE 2,211,436

PLASTIC MASSES FROM NITROCELLULOSE

Walter Reppe and Friederich Hoelscher, Ludwigshafen-on-the-Rhine, and Adolf Menger and Eugen Bock, Krefeld-Uerdingen, Germany, assignors, by mesne assignments, to General Aniline & Film Corporation, New York, N. Y., a corporation of Delaware No Drawing. Application May 19, 1937, Serial No. 143,533. In Germany May 23, 1936

5 Claims. (Cl. 260—17)

The present invention relates to plastic masses from nitrocellulose.

It has already been proposed to add polymerized or only partially polymerized vinyl compounds in the preparation of lacquers or threads from cellulose esters.

We have now found that plastic masses, such as pressed articles, films, foils, lacquers, artificial threads, impregnating and stiffening agents and coatings of all kinds derived from nitrocellulose have especially good properties when they contain as gelatinizing or softening agents polymerization products of vinyl ethers, soluble in water, methanol or ethanol. Suitable polymerization products of the said kind are for example polyvinyl methyl or ethyl ethers or interpolymerization products of different vinyl ethers, such as interpolymerization products of vinyl methyl or ethyl ethers and small amounts of vinyl ethers of higher fatty alcohols or interpolymerization products of vinyl isobutyl ether and glycerol formaldehyde acetal vinyl ether, or also interpolymerization products of preponderating amounts of a vinyl ether and another vinyl compound capable of being polymerized under the same conditions, such as styrene or vinyl amines.

Contrary to expectation, films, foils, coatings and the like of nitrocellulose and the said vinyl ether polymerization products, which by themselves are soluble in water or more or less capable of swelling in water, are entirely insoluble in water and no longer capable of swelling therein. Furthermore, the said polyvinyl ethers are not dissolved out when the said masses are treated with water. Thus for example from solutions of nitrocellulose and the interpolymerization products (soluble or capable of swelling in water) from vinyl methyl ether with vinyl ethers of hydrogenated sperm oil alcohols in organic solvents there may be prepared by means of film-casting machines entirely waterproof films having especially good mechanical properties which are even considerably superior in their strength properties to those prepared from nitrocellulose gelatinized with camphor, as may be seen from the following comparative table:

Nitrocellulose films prepared with polyvinyl methyl ether or its water-soluble interpolymerization products are still entirely waterproof even with an addition of 50 per cent of the said water-soluble polyvinyl ethers (calculated with reference to nitrocellulose). The polyvinyl ethyl ether and the interpolymerization products soluble in methanol or ethanol and to a certain degree capable of swelling in water containing the same also have the same good softening and gelatinizing action. They also yield with nitrocellulose plastic masses of entirely waterproof nature.

The preparation of the plastic masses is preferably effected by bringing solutions and/or emulsions of the components in water or organic solvents or mixtures of the same to dryness after suitable mixing, or by uniting the components as such by kneading, rolling and the like. The masses may also be worked up into shaped articles by casting, spraying, pressing, drawing, cutting, and the like. They may contain fillers, dyestuffs and if desired still further softening agents besides the said vinyl ether polymerization products and other additions usual in the preparation of plastic masses. They are generally speaking distinguished by especially high elasticity, good stability to ageing and good electrical properties. The masses may be used with advantage for films for photographic purposes, as intermediate layers for non-splintering glass, for foils for insulating purposes in the electrical industry, for primings and coatings of all kinds, for artificial leather and lacquers and for the impregnation of fibres and fibrous material of all kinds.

The following examples will further illustrate how the present invention may be carried out in practice, but the invention is not restricted to these examples. The parts are by weight.

Example 1

790 parts of a nitrocellulose solution of low viscosity which contains in each 100 parts 10 parts of nitrocellulose, 30 parts of ethyl acetate, 20 parts of butyl acetate, 10 parts of butanol and 30 parts of toluene are mixed with 89 parts of a solution of 10 parts of an interpolymerization product of vinyl methyl ether with 10 per cent

| | Strength in kg. | Relative holding point | Extension | Crease value | Percussion strength in kg./cm.³ | Extension in water |
|---|---|---|---|---|---|---|
| (a) Nitrocellulose film with 10 percent of camphor | 118 | 88 | 36.9 | 149 | 430 | 0.29 |
| (b) Nitrocellulose film with 10 percent of interpolymerization product of vinyl methyl ether and 10 percent of the vinyl ether of hydrogenated sperm oil alcohol | 138 | 74 | 37.4 | 148 | 410 | 0.30 | of the vinyl ether of hydrogenated sperm oil alcohol in 90 parts of benzene and worked up by means of a film-casting machine in the usual manner.

Colorless, glass-clear foils and films are thus obtained which are equal or superior to films prepared from nitrocellulose while using camphor as the softening and gelatinizing agent as regards stability to water (measured by the extension in water) and stability to heat.

Films having similar good properties, in particular also a good waterproof nature, are obtained from solutions having a higher content of polyvinyl methyl ether, as for example 530 parts of nitrocellulose and 270 parts of polyvinyl methyl ether.

*Example 2*

710 parts of the nitrocellulose solution specified in Example 1 are mixed with 180 parts of a solution of 10 parts of polyvinyl ethyl ether in 90 parts of benzene and worked up by means of a film-casting machine. Films having excellent mechanical properties are obtained.

Instead of polyvinyl ethyl ether there may also be used interpolymerization products of a preponderating amount of vinyl ethyl ether and styrene.

*Example 3*

100 parts of a nitrocellulose solution of low viscosity obtained by dissolving 100 parts of nitrocellulose in 165 parts of ethyl acetate, 100 parts of butyl acetate, 35 parts of butanol, 132 parts of toluene and 133 parts of benzene are mixed with 300 parts of a solution of 80 parts of polyvinyl ethyl ether dissolved in 80 parts of ethyl acetate, 40 parts of butyl acetate, 30 parts of butanol, 85 parts of toluene and 85 parts of benzene and the whole is worked up by means of a film-casting machine in the usual manner. Colorless glass-clear films of a high elasticity and stability to water are thus obtained.

*Example 4*

A solution of 300 parts of a nitrocellulose of low viscosity dissolved in 495 parts of ethyl acetate, 300 parts of butyl acetate, 105 parts of butanol, 395 parts of toluene and 400 parts of benzene is mixed with a solution containing 100 parts of an interpolymerization product of 70 per cent isobutyl vinyl ether and 30 per cent of glycerine formaldehyde acetal vinyl ether dissolved in 200 parts of ethyl acetate, 50 parts of butyl acetate and 50 parts of ethanol, and the whole is worked up in a film-casting machine in the usual manner. Films having excellent mechanical properties are thus obtained.

What we claim is:

1. Plastic masses comprising nitrocellulose and a polyvinyl ether soluble in a solvent of the group consisting of water, methanol and ethanol.
2. Plastic masses comprising nitrocellulose and an interpolymerization product of different vinyl ethers soluble in a solvent of the group consisting of water, methanol and ethanol.
3. Plastic masses comprising nitrocellulose and polyvinyl methyl ether.
4. Plastic masses comprising nitrocellulose and polyvinyl ethyl ether.
5. Plastic masses comprising nitrocellulose and an interpolymerization product of vinyl methyl ether and a vinyl ether of hydrogenated sperm oil alcohols.

WALTER REPPE.
FRIEDERICH HOELSCHER.
ADOLF MENGER.
EUGEN BOCK.